US010801689B2

(12) United States Patent
Mitterlehner et al.

(10) Patent No.: US 10,801,689 B2
(45) Date of Patent: Oct. 13, 2020

(54) METHOD FOR CONTROLLING A MOTOR VEHICLE HEADLIGHT

(71) Applicant: ZKW GROUP GMBH, Wieselburg (AT)

(72) Inventors: Thomas Mitterlehner, Mank (AT); Jan Koller, Vienna (AT); Emanuel Weber, Baden (AT); Patrik Schantl, Wr. Neustadt (AT)

(73) Assignee: ZKW Group GmbH, Wieselburg (AT)

( * ) Notice: Subject to any disclaimer, the term of this patent is extended or adjusted under 35 U.S.C. 154(b) by 141 days.

(21) Appl. No.: 16/064,252

(22) PCT Filed: Dec. 19, 2016

(86) PCT No.: PCT/AT2016/060132
§ 371 (c)(1),
(2) Date: Jun. 20, 2018

(87) PCT Pub. No.: WO2017/106894
PCT Pub. Date: Jun. 29, 2017

(65) Prior Publication Data
US 2019/0011107 A1    Jan. 10, 2019

(30) Foreign Application Priority Data

Dec. 22, 2015    (AT) .................................. 51093/2015

(51) Int. Cl.
*F21S 41/141*    (2018.01)
*F21S 41/675*    (2018.01)
(Continued)

(52) U.S. Cl.
CPC .............. *F21S 41/675* (2018.01); *B60Q 1/14* (2013.01); *F21S 41/141* (2018.01); *F21S 41/16* (2018.01);
(Continued)

(58) Field of Classification Search
CPC ........ F21S 41/675; F21S 41/663; F21S 41/16; F21S 41/141; F21S 41/60; B60Q 1/14; G02B 26/0833; G02B 26/0825
See application file for complete search history.

(56) References Cited

U.S. PATENT DOCUMENTS

| 10,309,607 B2 * | 6/2019 | Hechtfischer ...... G02B 26/0833 |
| 2013/0094235 A1 * | 4/2013 | Sugiyama .......... G02B 26/0858 362/514 |

(Continued)

OTHER PUBLICATIONS

International Search Report for PCT/AT2016/060132, dated Apr. 13, 2017 (2 pages).

*Primary Examiner* — Arman B Fallahkhair
(74) *Attorney, Agent, or Firm* — Eversheds Sutherland (US) LLP

(57) ABSTRACT

The invention relates to a method for controlling a motor vehicle headlight which at least comprises a laser diode (1) and a light conversion element (8) paired with the laser diode (1). Light conversion element (8) regions corresponding to different regions of the light image (11') can be illuminated periodically and with a varying intensity by means of a light beam (2) of the laser diode (1), and the illumination intensity in the light conversion element (8) regions corresponding to the different regions of the light image (11') is adjusted simultaneously by both the relative illumination duration of the different regions as well as different luminous intensities of the laser diode (1) in the light conversion element (8) regions corresponding to the different regions of the light image (11'). In regions in which the light beam (2) is moved with an angular speed below a defined value for the angular speed, the laser diode (1) is solely deactivated and activated, and different luminous intensities of the laser diode (1) are set when the angular speed is above a defined value. The motor vehicle headlight
(Continued)

Figure 1:
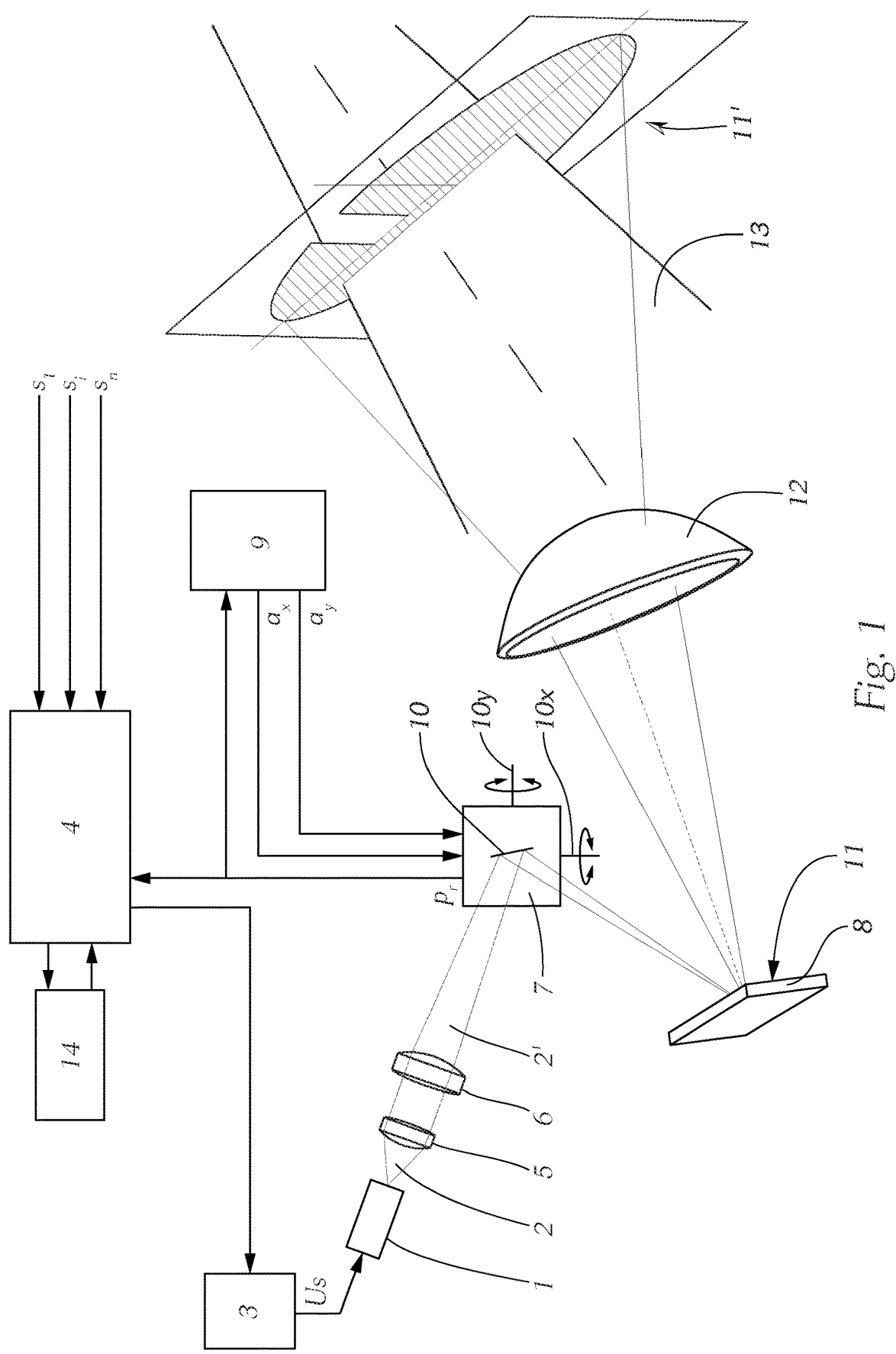

according to the invention has a computing unit (4) for carrying out the method according to the invention.

11 Claims, 3 Drawing Sheets

(51) Int. Cl.
*F21S 41/663* (2018.01)
*F21S 41/16* (2018.01)
*F21S 41/60* (2018.01)
*G02B 26/08* (2006.01)
*B60Q 1/14* (2006.01)

(52) U.S. Cl.
CPC ............. *F21S 41/60* (2018.01); *F21S 41/663* (2018.01); *G02B 26/0833* (2013.01); *G02B 26/0825* (2013.01)

(56) References Cited

U.S. PATENT DOCUMENTS

| | | | |
|---|---|---|---|
| 2013/0258689 A1* | 10/2013 | Takahira | F21V 14/00 362/465 |
| 2014/0029282 A1 | 1/2014 | Ravier et al. | |
| 2015/0016135 A1 | 1/2015 | Erdi et al. | |
| 2015/0377442 A1* | 12/2015 | Bhakta | F21S 41/25 362/510 |
| 2016/0252804 A1* | 9/2016 | Kurashige | G02B 27/48 362/259 |
| 2018/0022266 A1* | 1/2018 | Tzeng | B60Q 1/0408 362/466 |
| 2018/0043820 A1* | 2/2018 | Murakami | F21S 41/00 |
| 2018/0297511 A1* | 10/2018 | Park | B60Q 1/1423 |
| 2019/0145598 A1* | 5/2019 | Gammer | F21S 41/675 362/517 |
| 2019/0145599 A1* | 5/2019 | Kogure | F21S 41/675 362/514 |

* cited by examiner

METHOD FOR CONTROLLING A MOTOR VEHICLE HEADLIGHT

The invention relates to a method for controlling a motor vehicle headlight which at least comprises a laser diode and a light conversion element assigned to the laser diode. Light conversion element regions corresponding to different regions of the light image can be illuminated periodically and with a varying intensity by means of a light beam of the laser diode, and the illumination intensity in the light conversion element regions corresponding to the different regions of the light image is adjusted simultaneously by both the relative illumination duration of the different regions as well as different luminous intensities of the laser diode in the light conversion element regions corresponding to the different regions of the light image and the relative illumination duration is achieved by pivoting the light beam at various speeds into the regions of the light conversion element corresponding to the different regions of the light beam. Furthermore, the invention relates to a vehicle headlight with at least one laser diode that can be adjusted with regard to its luminous intensity, the laser beam of which can be guided onto a light conversion element in a scanning manner in order to generate a light image on this, which is projected as a light image onto the road via an imaging system, and a deflection mirror of the light scanner can be pivoted in at least one coordinate direction in accordance with defined control characteristic, as well as with a laser control system and a computing unit assigned to this.

In the state of the art, various types of vehicle headlights are known, wherein, in recent years, primarily headlights with discharge lamps and halogen light sources have been used. For energy-saving reasons and in order to further reduce the space requirements of vehicle headlights, the use of laser diodes, such as semiconductor lasers, have increasingly been tried and tested, since these are of an advantage regarding this. In order to render the laser light for a vehicle headlight usable, a light conversion element, a so-called phosphor converter, is irradiated with a laser diode, which is stimulated to emit visible light by means of this. Thereby, the phosphor converter can be this opaque, in which case, the laser light is guided onto the on the emission side of the phosphor converter. As an alternative, the light conversion element can be of a transmissive type, where the laser beam is guided onto the back side of the phosphor converter and on the other side, the emission side, it is emitted as converted light.

In the case of so-called static systems, the laser beam is directed onto the phosphor converter in an immovable manner. In contrast to this, in the case of the so-called dynamic system, the laser beam or the laser beams, which are used to stimulate the phosphor converter, are moved across the phosphor converter with the aid of oscillating mirrors so that a light image emerges for the human eye, which corresponds to the outer shape of the phosphor converter or the light conversion element regions irradiated by the laser beam. Thereby, the laser beam sweeps the light conversion element, which emits light in the visible range in the currently irradiated region, wherein, due to the relatively high scanning speed of the laser beam, the human eye perceives a continuous illumination and no flicker or flare can be recognized. The light of light conversion element is emitted toward the front of the vehicle by reflectors and/or lens systems. As a result, certain light functions or precise light-dark boundaries of the light function, such as high-beam operation, low-beam operation and the like.

In order to implement complex light images and, in particular, in order to implement dynamic light functions, such as adaptive high-beam operation, the light image is built up from a plurality of different discrete regions, so-called pixels, in which varying illumination intensities can be implemented. The varying illumination intensities result from illumination and irradiation of the light conversion element at varying intensities into the different regions of the light conversion element corresponding to the pixels of the light image, the pixels of the light conversion element, wherein the known reflectors and/or lens systems are used to depict the various discrete light conversion element regions accordingly sharp in the area in front of the vehicle.

In order to achieve different illumination intensities in the light conversion element, principally, two options are available. Firstly, the luminous intensity of the laser diode can be adjusted differently depending on the pixel, which is directly irradiated or can be irradiated with the light of the laser diode due to the current position of the oscillating deflection mirror. In the case of this method, only a few luminous intensity levels of the laser diode can generally be provided on a technical level. For example, depending on its respective position, the laser diode can be operated at 0%, 50% or 100% of the maximum luminous intensity. Generally, a considerably higher number of different brightness levels in the light image are required in order to meet the requirements of modern automotive technology. For example, 256 brightness levels are desirable, for which, in the case of the first option, also 256 brightness levels of the laser diode would also have to be able to be set, which, however, is not feasible in practice due to the technical effort involved, which is associated with an increasing number of possible brightness levels of the laser diode and due to the increasing power loss. According to the second option, this can already be implemented with two brightness levels of the laser diode, provided that it is possible to set the relative illumination duration of the light conversion element via the light beam into the various regions or pixels of the light conversion element at 256 increments, for example. On the one hand, this can happen by means of the light pulses of the laser diode when sweeping the pixel so that the pixel only is only emitted half of the time for example (resulting in 50% of the luminous intensity being perceivable by the human eye) or the scanning period of the laser beam is small enough, meaning the scanning frequency of the laser beam is selected high enough in order to be able to set the varying relative irradiation duration in the individual pixels due to the variety of sweeping repetitions. The mentioned variety of sweeping repetitions or the mentioned high scanning frequency refers to a minimum frequency or base period of the light image structure, which must also be ensured for pixels with the lowest brightness level, which occurs if the corresponding pixel is also irradiated with one light pulse in the case of a multiple scanning frequency of the laser beam for other pixels, in order to ensure a light image that is free of flicker and is constant for the human eye. For example, if such a base period is $1/200$ seconds, in this case, the minimum frequency is 200 Hz (Hertz). In this case, a doubling of the scanning frequency means that all pixels with a frequency of 400 Hz can be irradiated, meaning the laser beam can sweep each pixel twice within the basic period of $1/200$ sec. If the pixel is illuminated twice, 100% brightness results; if the pixel is only illuminated once, 50% brightness results. In other words, in addition to the option, to not illuminate the pixel at all (the pixel remains dark), two levels of relative illumination duration are possible.

Both methods have their limits for achieving the mentioned high number of brightness levels since, on the one hand, when dimming a laser diode, meaning when setting a plurality of different light outputs to relative high levels of power loss and thereby resulting in a greater level of heat development, as this has already been stated in the above. On the other hand, it is however not possible to generate laser pulses short and precise enough to achieve the mentioned high number of brightness levels only based on the relative illumination duration. Furthermore, repeating the sweep in a single period cannot be infinitely performed a multiple of times since, here, the deflection systems, generally the aforementioned oscillating mirrors, would reach their mechanical limits. Another option of setting the relative illumination duration entails achieving a pivoting of the light beam at varying speeds in the light conversion element regions corresponding to the different regions of the light image by pivoting the light beam of the laser diode at varying speeds, whereby an exposure time of the light point of the laser beam into the individual regions results at a varying length. Where the light distribution should be bright, the laser spot is moved at a slower speed than is the case where the light distribution should be relatively dark. This type of adjusting of the relative illumination duration of the individual pixels is the object of the present invention since the requirements for the switching frequency of the laser diode in the case of the high scanning speed are many times higher. On the other hand, a pure switching of the laser diode, in terms of an activation and a deactivation of the laser diode, is preferred due to the high level of efficiency in the case of low scanning frequencies thereby associated with a lower switching frequency. Only at higher scanning speeds or switching frequencies do characteristics with regard to the electromagnetically shielding of corresponding circuits allow setting different luminous intensities of the laser diode seem favourable in terms of dimming the laser diode.

Therefore, the object of the present invention is to eliminate to the furthest extent possible the disadvantages of the mentioned switch types of the laser diode depending on the pivoting speed of the light beam of the laser diode.

In order to achieve this task, the method according to the invention based on a method of the aforementioned type is further developed so that, in regions, in which the light beam is moved at an angular speed under a defined value for the angular speed, only activating and deactivating the laser takes place and, above a defined value for the angular speed, various luminous intensities of the laser diode are adjusted. In order to achieve a large number of brightness levels, according to the present invention, the effects of the controlling the illumination intensity by controlling the relative illumination duration are combined with those of controlling the illumination intensity by controlling the luminous intensities of the laser diode. Each time the scanning period is cut in half leads to a doubling of the brightness levels, which can be depicted alone by the achievable varying relative illumination duration of the light conversion element regions corresponding to the different areas of the light image, just like each doubling of the number of settable luminous intensities of the laser diode leads to such a doubling of the achievable brightness levels. In this way, the disadvantages of the two mentioned types of generating different brightness levels can be kept at a low level. In Table 1, it is shown how each doubling of the scanning frequency with reference to the base period brings about a doubling of the presentable brightness levels.

TABLE 1

| Base period | Scanning frequency | Brightness resolution |
|---|---|---|
| 200 Hz | 400 Hz | 2 |
| | 800 Hz | 4 |
| | 1600 Hz | 8 |
| | 3,200 Hz | 16 |
| | 6,400 Hz | 32 |
| | 12,800 Hz | 64 |
| | 25,600 Hz | 128 |

In principle, the light beam of the laser diode can be guided along any pattern via the light conversion element. In accordance with a preferred variant of the present invention, however, the light conversion element is illuminated by the light beam of the laser diode along lines and/or columns, whereby an efficient light guidance is achieved, which allows for a high level of scanning speed.

Preferably, the light beam is moved back and forth along lines and/or columns so that no lost motion of the deflection mirror is required in order for it to return to its original position after running through a period. In the case of the light beam moving back and forth, under certain circumstances, the marginalised pixels are successively illuminated one after another very briefly when reversing the light beam, and considering that, consequently at a large time interval until the light beam has run to the other edge and back again. In order to take this circumstance into account and in order to avoid extreme cases, it can therefore preferably be provided that light pulses in a pixel required in order to achieve the relative illumination are not emitted successively, but distributed across a base period.

Preferably, the light beam of the laser diode is guided onto the light conversion element by means of a moveable deflection mirror, although each other type of deflection of the light beam of the laser diode is also conceivable, such as with the aid of moveable prisms.

In particular, the deflection mirror is part of an MEMS micro-scanner, thereby corresponding to a preferred embodiment of the present invention. MEMS micro-scanners are characterized by the precise feasibility of high scanning frequencies, which is advantageous in achieving a variety of brightness levels in the context of the present invention.

As an alternative however, the deflection mirror can be electromagnetically driven, thereby corresponding to a preferred embodiment of the present invention.

In accordance with a preferred embodiment of the present invention, three luminous intensities can be set on the laser diode, in particular, 100%, 50% and 0% of the maximum luminous intensity.

Preferably, in the case of the method according to the invention, the defined value for the angular speed is selected between 4000°/sec and 8000°/sec, in particular, between 5000°/sec and 7000°/sec, in particular with 6000°/sec. In particular the, value of 6000°/sec has been recognized as relevant in practice since, as of this value, the problems of the electromagnetic shielding in the case of controlling the laser diode to generate the rapid light pulses corresponding to the rapid scanning speed are prevalent in comparison to the more favourable setting of varying luminous intensities in the high frequency range, meaning dimming the laser diode.

Based on a vehicle headlight of the aforementioned type, the vehicle headlight according to the invention is characterized in that the computing unit is set up to carry out the method that has just been explained.

The method according to the invention is explained using the figures in the drawing. The figures show FIG. 1 the main components of a vehicle headlight to use the method according to the invention, FIG. 2 an illustration of a method to control a vehicle headlight, where the illumination intensity is set via an alternating luminous intensity of the light diode.

Figure 3A:
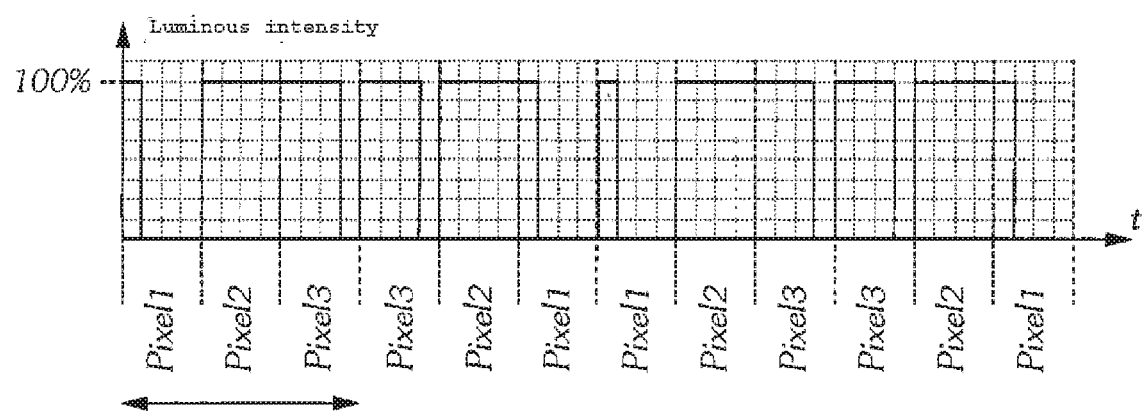
Figure 3B:
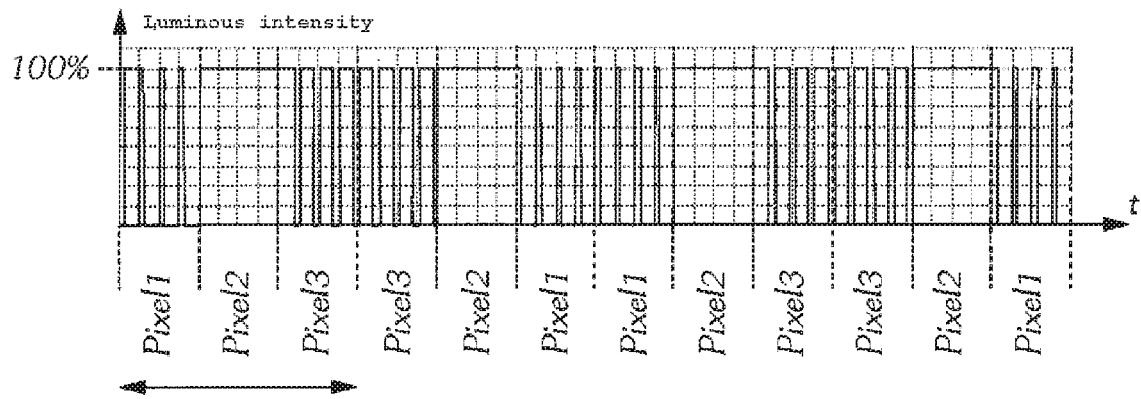
Figure 4:
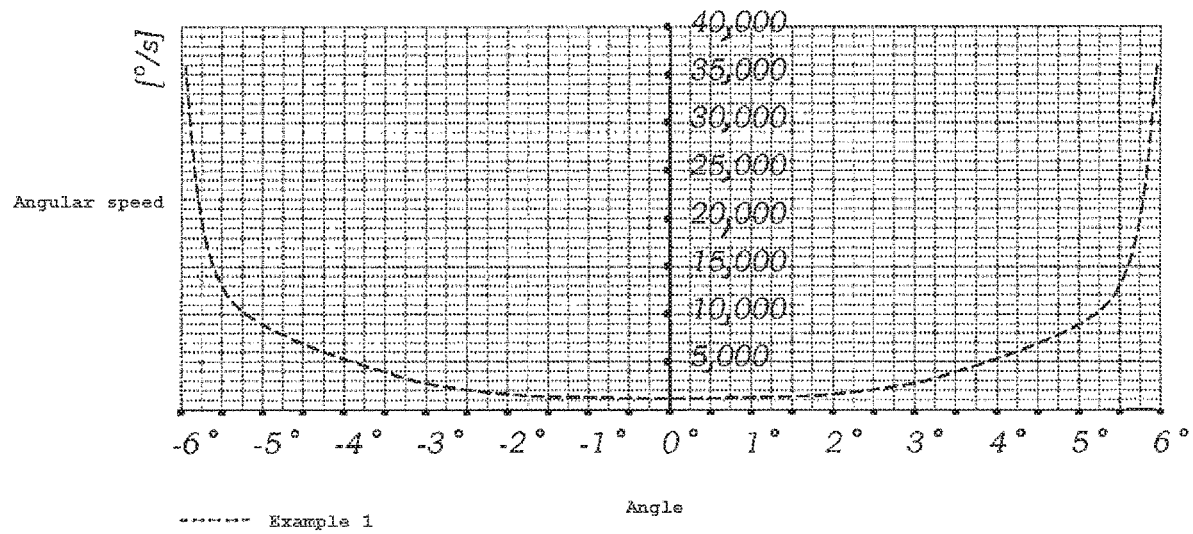
Figure 5:
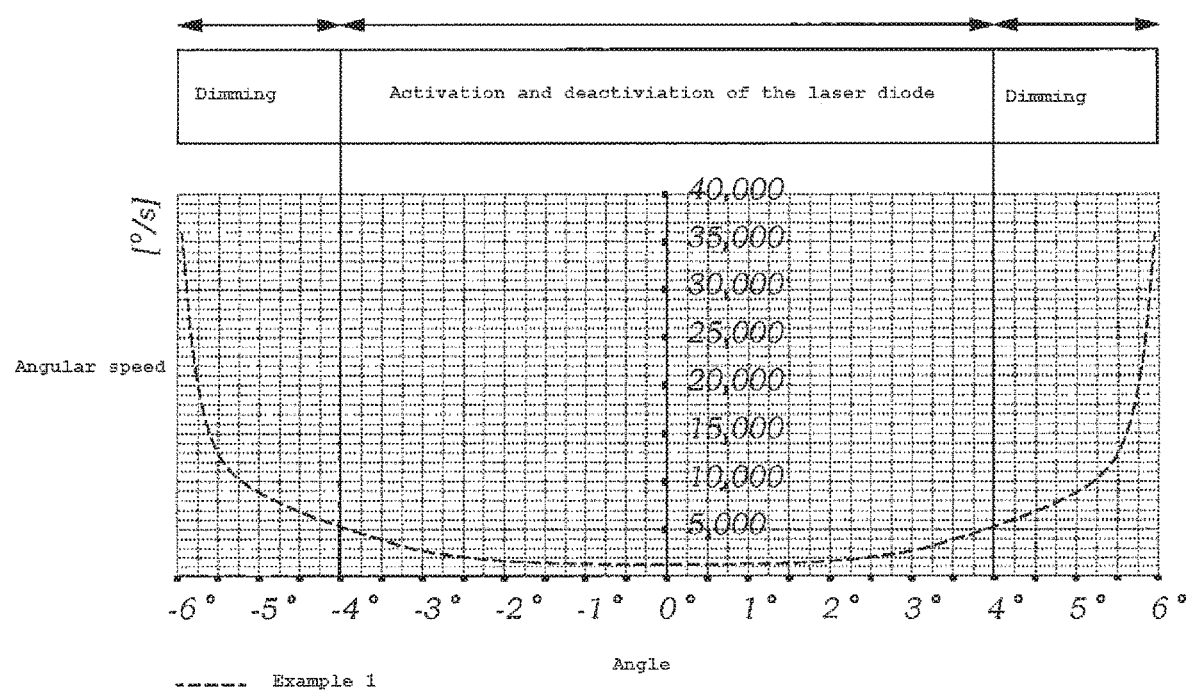

FIG. 3a-3b illustrations of methods that are not according to the invention, where the illumination intensity is set via the relative illumination duration of the different regions, FIG. 4 a representation of pivoting the light beam at a varying speed and FIG. 5 an example of defined values where, according to the invention, a change of the modulation type of the laser diode results.

Taking FIG. 1 into account, an exemplary embodiment of the invention will now be described in detail. In particular, the parts important to a headlight according to the invention are shown, wherein it is clear that a car headlight still contains many other parts, which make its practical use in a vehicle, such as a passenger car or a motorcycle, possible. The light-technical base of the laser diode 1, which emits a laser beam 2 and which a laser control system 3 is assigned to, wherein this control system 3 is used to supply power as well as to monitor the laser emission or, for example, is used to control the temperature and is also set up to module the intensity of the emitted laser beam. Under "modulating" in the context of the present invention, it is understood that the intensity of the laser diode can be change, whether it is continuous or pulsed in terms of activating and deactivating it. It is essential that the light output can be changed depending on the angular position a mirror, which will be described later on. In addition, there is still the option of activating and deactivating it for a certain period of time. An example of a dynamic control concept for generating an image via a scanning light beam is described in the document AT 514633 of the applicant for example. The control signal of laser diode 1 is marked with "Us".

In contrast, the laser control system 3 for its part receives signals from a central computing unit 4, to which sensor signals s1, si, sn can be supplied. On the one hand, these signals can, for example, be switching commands to switch from high-beam operation to low-beam operation or, on the other, signals that are received by sensors S1 . . . Sn, such as cameras, which register the illumination conditions, ambient conditions and/or objects on the road. Also, the signals can come from a piece of vehicle-to-vehicle communication information. Here, the computing unit 4 schematically drawn as a block can be fully or partially contained in the headlight and, in particular, is also used for carrying out the method of the invention described further below.

The laser diode 1 emits, for example, blue or UV light, wherein collimator optics 5 as well as focussing optics 6 are subordinated to a laser diode. The design of the optics, among other things, depends on the type, quantity and the spatial placement of the laser diodes used, on the required beam quality and on the desired laser spot size on the light conversion element.

The focused and shaped laser beam 2' reaches a light scanner 7 and is reflected by a deflection mirror 10 to a light conversion element 8 designed as an illuminating surface in the present example, which, in a known way, has a phosphor for light conversion, for example. The phosphor converts blue or UV light into "white" light. In the context of the present invention, under "phosphor", a substance or a substance mixture is generally understood, which converts light of a wavelength in the light of a different wavelength or a wavelength mixture, in particularly into "white" light, which can be subsumed under the term "wavelength conversion".

Luminescent dyes are used, wherein the output wavelength is generally shorter and therefore more rich in energy than the emitted wavelength mixture. The desired white-light impression thereby results by means of additive colour mixing. Thereby, under "white light", light of such a spectral composition is understood that causes the colour impression "white" among humans. The term "light" is naturally not limited to the radiation visible to the human eye. For the light conversion element, for example, opto-ceramics come into question, which are transparent ceramics, such as YAG: CE (yttrium aluminium garnet endowed with Cer).

On this note, it must be noted that, in the drawing, the light conversion element 8 is shown as a phosphor surface, on which the scanning laser beam 2 or the scanning laser beams generate an image, which is projected originated from this side of the phosphor. However, it is also possible to use a translucent phosphor where the laser beam 2 coming from the side facing away from the projection lens generates an image, wherein, however, the emitting side is located on the side of the light conversion element facing the projection lens. Thereby, both reflecting as well as transmissive beam baths are possible, wherein, ultimately, also a mixture of reflecting and transmissive beam paths is not ruled out.

In the present example, the deflection mirror 10 oscillating around two axes is controlled by a mirror control system 9 with the aid of driver signals ax, ay and, for example, is deflected into two directions x, y, which are orthogonal to one another. The mirror control system 9 are controlled by the computing unit 4 in order to be able to adjust the oscillation amplitudes of the deflection mirror 10, as well as its current angular speed, wherein asymmetrical oscillation around the respective axis can be adjusted. The control system of the deflection mirrors is known and can occur in a variety of ways, for example, electrostatically or electrodynamically. With the tried and tested embodiments of the invention, the deflection mirror 10 pivots in the x-direction around a first rotational axis 10x and in the y-direction around a second rotational axis 10y and, depending on its control system, its maximum deflection leads to deflections in the resulting light image of +/−35° in the x-direction and −12° to +6° in the y-direction, wherein the mirror deflections are half of these values.

The position of the deflection mirror 10 is expediently fed back to the mirror control system 9 and/or to the computing unit 4 with the aid of a position signal pr. It must be noted that other beam deflection means, such as moveable prisms for example, can be used although the use of a deflection mirror is preferred.

Thereby, the laser beam 6 scans via the light conversion element 8, which is generally level, however, does not have to be level and generates a light image 11 with a predefined distribution of light. This light image 11 is now projected as a light image 11' onto the road 13 by means of an imaging system 12. Thereby, the laser diode is pulsed with higher frequency pulsed or continuously controlled so that, according to the position of the deflection mirror 10, any desired distributions of light cannot only be adjusted, for example, for high-beam operation/low-beam operation, but also can be changed rapidly if this requires a special terrain or road situation, for example if a pedestrian or oncoming vehicles are detected by means of one or a plurality of sensors S1 . . . Sn and, accordingly, a change of the geometry and/or intensity of the light image 11' of the road illumination is desired. Here, the imaging system 12 is represented as a lens.

The term "road" is used here for a simplified representation, because, naturally, it depends on the light image 11' is actually located on the road or also extends beyond that. In principle, the image 11' corresponds to a projection on a vertical surface in according with relevant standards referring to automotive lighting technology.

Figure 2:
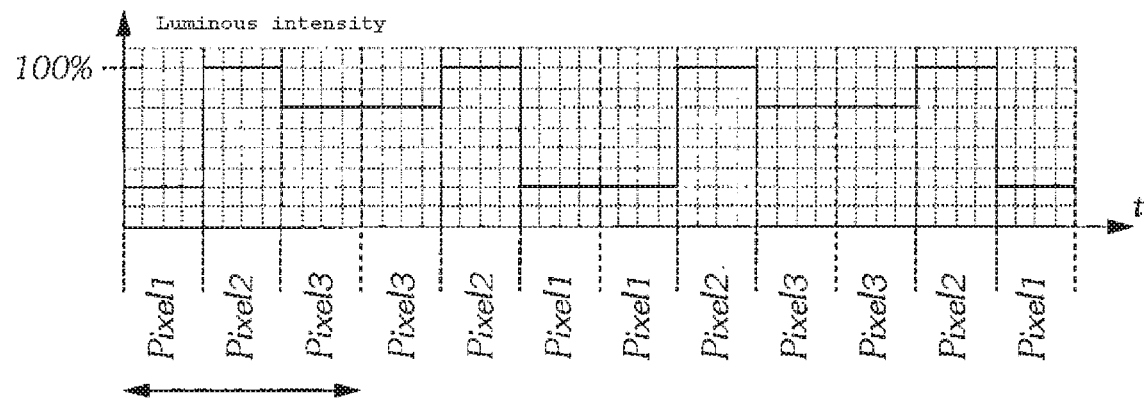

In FIG. 2 and other figures, now, the lighting scheme on the light conversion element 8 is shown in a simplified manner for only three pixels. In FIG. 2, the different regions or pixels of the light conversion element 8 corresponding to the different regions of the light image are scanned periodically with a period duration of ½₀₀ sec, wherein the laser diode is adjusted differently with regard to its luminous intensity in the different pixels, meaning within the period of ½₀₀ sec, meaning the illumination intensity in the different regions is adjusted via a varying luminous intensity. In the example shown in FIG. 2, a luminous intensity of 25% of the maximum luminous intensity of the laser diode 1 is adjusted in pixel 1; a luminous intensity of 100% of the maximum luminous intensity of the laser diode is adjusted in pixel 2 and, in pixel 3, a luminous intensity of 75% of the maximum luminous intensity of the laser diode 1 is adjusted, the settings of which remain, even in the case there is multiple scanning of the light conversion element 8, being four times in the present example. Altogether, from this, 25% brightness in pixel 1 results, 100% brightness in pixel 2 results and 75% brightness in pixel 3 results.

In FIGS. 3a and 3b, different options are shown, which adjust the illumination intensity via the relative illumination duration of the different regions. In FIG. 3, the different regions or pixels of the light conversion element 8 corresponding to the different regions of the light image are also scanned periodically with a period duration of ½₀₀ sec, wherein the laser diode can only be adjusted between 0% and 100% of the maximum luminous intensity of the laser diode. In order to achieve an illumination intensity corresponding to the example from FIG. 2, however, pixel 1 is only irradiated at 25% of the time, in which the laser beam runs through pixel 1. Pixel 2 is irradiated during 100% of the running time and pixel 3 is irradiated during 75% of the running time. This can be recognized in FIG. 3a by the luminous intensity falling after 25% of the run-through of pixel 1 to 0% of the maximum luminous intensity of the laser diode 1. In the case of the run-through of pixel 2 at 100% of the maximum luminous intensity of the laser diode 1 remains constant and, in the case of the run-through of pixel 3, it drops after 75% of the run-through to 0% of the maximum light intensity of the laser diode 1. Therefore, for the human eye, relative brightness impressions result in the individual pixels, which correspond to the mentioned relative irradiation times. Such a method is referred to as pulse-width modulation.

In FIG. 3b, the pixels are also irradiated to the extent of the relative irradiation times as shown in FIG. 3a, however, the irradiation here occurs a four times the pulse-width modulation, which leads to a more homogenous light image. In turn, a period, in which all the pixels are run through, measures ½₀₀ sec, wherein four identical run-throughs are shown. Therefore, for the human eye, in turn, brightness impressions result in the individual pixels, which correspond to the mentioned relative irradiation times.

In the diagram in accordance with FIG. 4, pivot angles of the light beam 2 of the laser diode 1 are applied to the ordinate against the angular speed of the pivot on the abscissa. It is apparent that, in this example, the angular speed about 1000°/sec at a 0° pivot, meaning when the light beam 2 of the laser diode 1 irradiates a region of the light conversion means 8 that is located in the middle of the corresponding light distribution 11'. In contrast to this, the angular speed at the edge of the light conversion means 8, which is irradiated or can be irradiated at a +/−6° pivot of the light beam 2 of the laser diode 1, can be 40 times higher (here, approx. 36,000°/sec). Due to the large differences in speed, the different regions of light conversion means vary in length and are therefore are irradiated at a different intensity, which results in a different relative illumination duration of the different regions.

In the diagram in accordance with FIG. 5, it is symbolized that, according to the invention, a value for the angular speed of the pivoting of the light beam 2 of the laser diode has been defined, as of which from a pure activation and deactivation of the laser diode 1 is changed to a, more or less, continuous control of the laser diode in terms of adjusting different luminous intensities of the laser diode 1, meaning a dimming of the laser diode, in order to avoid the above-mentioned problems of modulating the laser power by activating and activating the laser diode 1 at high switching frequencies and, however, achieving a high resolution of the illumination intensities of the light conversion means.

The invention claimed is:

1. A method for controlling a motor vehicle headlight, which comprises a laser diode and a light conversion element assigned to the laser diode, wherein light conversion element regions corresponding to different regions of a light image are configured to be illuminated periodically and with a varying intensity with a light beam of the laser diode, wherein an illumination intensity in the light conversion element regions corresponding to the different regions of the light image is configured to be adjusted simultaneously by both a relative illumination duration of the different regions as well as different luminous intensities of the laser diode in the light conversion element regions corresponding to the different regions of the light image, and wherein the relative illumination duration is achieved by pivoting the light beam at varying speeds via the light conversion element regions corresponding to the various areas of the light image, the method comprising: when the light beam is moved with an angular speed below a defined value of the angular speed, deactivating and activating the laser diode to a constant luminous intensity to adjust the relative illumination duration of the regions, and when the light beam is moved with an angular speed above the defined value of the angular speed, setting different luminous intensities of the laser diode to adjust the luminous intensity of the regions, wherein the defined value for the angular speed is between 4000°/sec and 8000°/sec to reduce the problems of electromagnetic shielding.

2. The method of claim 1, wherein the light beam (2) of the laser diode (1) is guided onto the light conversion element (8) by a moveable deflection mirror (10).

3. The method of claim 2, wherein the deflection mirror (10) is part of an MEMS micro-scanner.

4. The method of claim 2, wherein the deflection mirror (10) is electromagnetically driven.

5. The method of claim 1, wherein the light conversion element (8) is illuminated by the light beam (2) of the laser diode (1) along lines and/or columns.

6. The method of claim 5, wherein the light beam (2) is moved back and forth along the lines and/or columns.

7. The method of claim 1, wherein the laser diode (1) comprises at least three different luminous intensity settings.

8. The method of claim 7, wherein the at least three different luminous intensity settings comprise 100%, 50%, and 0% of a maximum luminous intensity of the laser diode (1).

9. A vehicle headlight comprising:
   at least one laser diode (1) that is configured to be adjusted with regard to a luminous intensity;
   a light conversion element (8), wherein a laser beam (2) of the at least one laser diode (1) is configured to be guided onto the light conversion element (8) in a scanning manner in order to generate a light image (7) thereon, which is projected as a light image (11') onto-a road via an imaging system (12);
   a deflection mirror (10) configured to be pivoted in at least one coordinate direction in accordance with defined control characteristics; and
   a laser control system (3) and a computing unit (4) assigned thereto, wherein the computing unit (4) is configured to control the motor vehicle headlight according to claim 1.

10. The method of claim 1, wherein the defined value for the angular speed is between 5000°/sec and 7000°/sec.

11. The method of claim 1, wherein the defined value for the angular speed is 6000°/sec.

* * * * *